United States Patent
Cardile

(10) Patent No.: US 9,580,118 B2
(45) Date of Patent: Feb. 28, 2017

(54) CAR PROVIDED WITH A REAR SPOILER

(71) Applicant: Ferrari S.p.A., Modena (IT)

(72) Inventor: Enrico Cardile, Formigine (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 15/046,561

(22) Filed: Feb. 18, 2016

(65) Prior Publication Data

US 2016/0244106 A1 Aug. 25, 2016

(30) Foreign Application Priority Data

Feb. 19, 2015 (IT) ............................. BO2015A0084

(51) Int. Cl.
*B62D 37/02* (2006.01)
*B62D 35/00* (2006.01)
*B60K 8/00* (2006.01)

(52) U.S. Cl.
CPC .............. *B62D 35/007* (2013.01); *B60K 8/00* (2013.01); *B62D 35/00* (2013.01); *B62D 37/02* (2013.01)

(58) Field of Classification Search
CPC .. B60D 35/007; B60D 35/005; B60D 35/008; B60D 37/02; B60J 1/20
See application file for complete search history.

(56) References Cited

U.S. PATENT DOCUMENTS

| 4,195,874 A | * | 4/1980 | Janssen | ................ | B62D 35/007 296/180.1 |
| 5,199,762 A | * | 4/1993 | Scheele | ................. | B60J 1/2008 296/180.1 |
| 5,282,560 A | * | 2/1994 | Ozog | ................... | B62D 35/007 224/309 |
| 5,346,274 A | | 9/1994 | Syamal et al. | | |
| 5,688,020 A | * | 11/1997 | Burg | .................... | B62D 35/007 296/180.1 |
| 6,273,488 B1 | * | 8/2001 | Pike | ...................... | B05D 5/083 296/180.1 |
| 7,111,898 B2 | * | 9/2006 | Rinklin | ................ | B62D 35/007 296/180.1 |

(Continued)

FOREIGN PATENT DOCUMENTS

| JP | 3-125677 A | 5/1991 |
| JP | 3-88989 U | 9/1991 |
| WO | WO 2014/020342 A2 | 2/2014 |

OTHER PUBLICATIONS

2010 Lamborghini Murcielago LP670-4 SV Superveloce; http://www.classicmotorsales.net/home/cars/1-cars---trade/45808-2010-lamborghini-murcielago-Ip670-4-sv-superveloce#ad-image-23.*

*Primary Examiner* — Emma K Frick
(74) *Attorney, Agent, or Firm* — Blank Rome LLP

(57) ABSTRACT

A car comprising a car body and a rear spoiler that projects from the outline of the car body to deflect the air flow upwards so that the air flow skims over an upper surface of said rear spoiler. The rear spoiler comprises a through aerodynamic duct, which starts in an inlet opening arranged in correspondence with an initial end of the rear spoiler and ends in an outlet opening arranged in correspondence with a final end of the rear spoiler, so that a part of the air flow hitting the rear spoiler flows above the rear spoiler, skimming over the upper surface of the rear spoiler, and the remaining part of the air flow hitting the rear spoiler flows through the rear spoiler crossing the aerodynamic duct.

9 Claims, 5 Drawing Sheets

(56) References Cited

U.S. PATENT DOCUMENTS

| | | | | |
|---|---|---|---|---|
| 7,175,229 B2* | 2/2007 | Garcia | ............... | B62D 35/007 |
| | | | | 296/180.1 |
| 7,226,117 B2* | 6/2007 | Preiss | ............... | B62D 35/007 |
| | | | | 296/180.1 |
| 8,651,211 B2* | 2/2014 | Wolf | ............... | B62D 35/007 |
| | | | | 180/68.1 |
| 2006/0290169 A1* | 12/2006 | Fukushima | ............ | B60Q 1/302 |
| | | | | 296/180.1 |
| 2012/0242833 A1* | 9/2012 | Yamaguchi | .......... | B62D 35/007 |
| | | | | 348/148 |
| 2013/0226414 A1* | 8/2013 | De Luca | ............. | B62D 37/02 |
| | | | | 701/49 |

\* cited by examiner

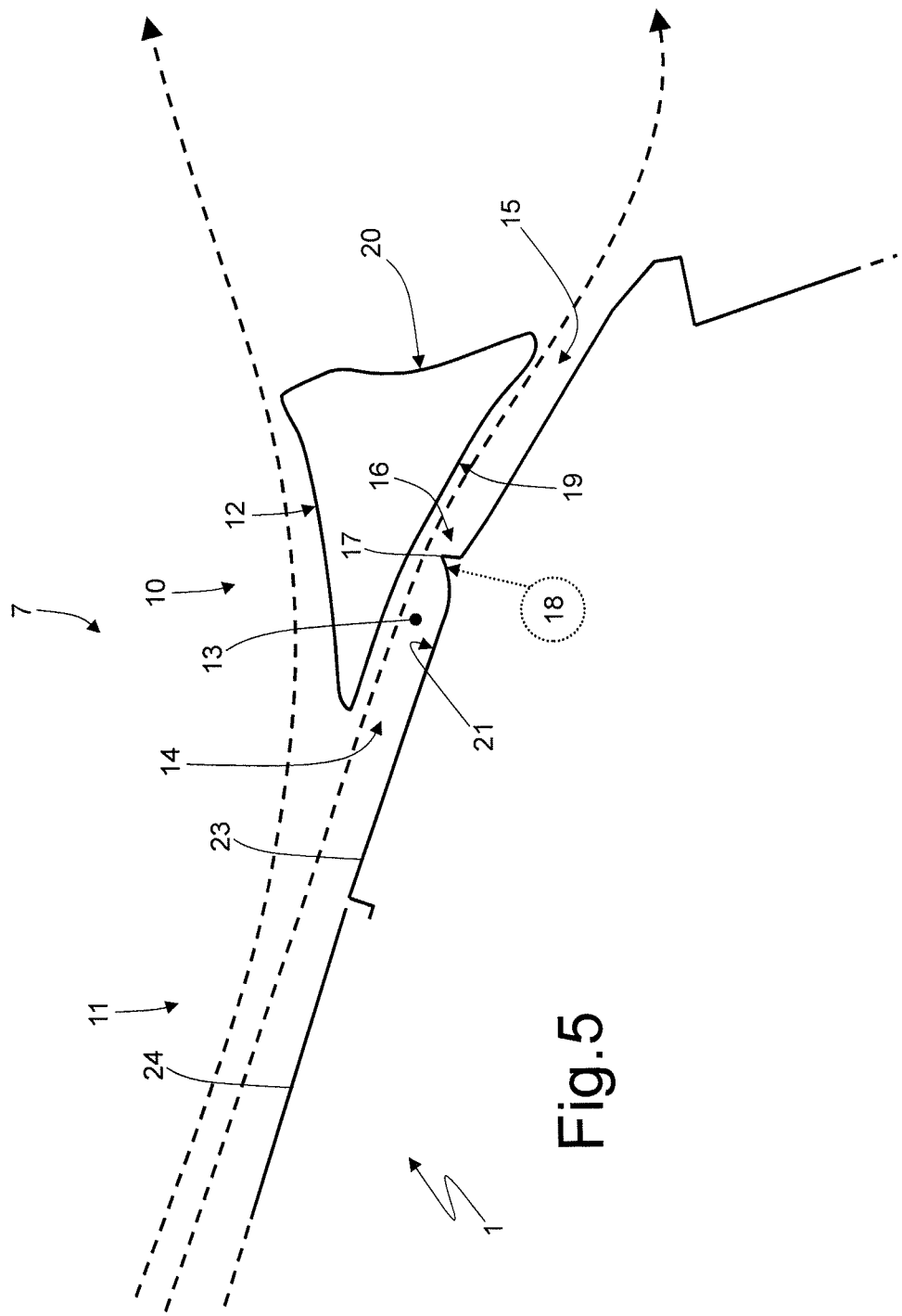

US 9,580,118 B2

CAR PROVIDED WITH A REAR SPOILER

FIELD OF THE INVENTION

The present invention relates to a car provided with a rear spoiler.

DESCRIPTION OF THE RELATED ART

In high-performance cars the aerodynamics are designed to generate a strong negative lift (i.e., a strong downforce) while at the same time reducing drag to a minimum. Thus, the aerodynamic efficiency of a car is measured as a function of the ratio between the negative lift and the corresponding drag: the higher this ratio, the greater the aerodynamic efficiency of the car.

In order to increase the negative lift on the rear axle, a method known in the prior art consists of mounting a rear spoiler, i.e., an aerodynamic element projecting from the outline of the car body that deflects the air flow upwards. It is important to note that the rear spoiler is an element that extends upwards from the car body and constitutes a seamless extension of said car body; thus, the air flow is forced to bypass the rear spoiler, i.e. to pass over the rear spoiler without any possibility of passing beneath said rear spoiler.

Alternatively, instead of mounting a rear spoiler to the car body, it is possible to mount a rear wing, which comprises at least one winged profile arranged at a certain distance from the rest of the car body and is usually supported by a central support or by two lateral supports; the air flow hits the winged profile on both its upper surface and its lower surface, generating a downforce according to the same principle of physics that explains how aeroplanes fly. However, a rear wing is a relatively bulky element and may be associated with several drawbacks (such as higher production costs, reduced rear visibility, restricted access to the rear compartment, which may house the engine or a boot).

PCT Patent Application Publ. No. WO 2014/020342A1 describes a car comprising a rear spoiler that is integral with the car body, is arranged in a rear position and projects from the outline of the car body to deflect the air flow upwards so that the air flow skims over an upper surface of said rear spoiler; the rear spoiler comprises a through aerodynamic duct which starts in an inlet opening arranged in correspondence with an initial end of the rear spoiler and ends in an outlet opening arranged in correspondence with a final end of the rear spoiler so that a part of the air flow hitting the rear spoiler flows above the rear spoiler skimming over the upper surface of said rear spoiler and the remaining part of the air flow hitting the rear spoiler flows through the rear spoiler crossing the aerodynamic duct. In particular, the aerodynamic duct has a constant cross-section which remains the same along the entire length of said aerodynamic duct.

SUMMARY OF THE INVENTION

The purpose of the present invention is to provide a car provided with a rear spoiler, said car having good aerodynamic efficiency in the rear part and, at the same time, being easy and economical to produce.

According to the present invention, there is provided a car provided with a rear spoiler according to that set forth in the appended claims.

BRIEF DESCRIPTION OF THE DRAWINGS

The present invention will now be described with reference to the accompanying drawings, illustrating a non-limiting embodiment thereof, in which:

FIG. 5 is a longitudinal section along the line V-V of the car of FIG. 1.

PREFERRED EMBODIMENTS OF THE INVENTION

Figure 1:
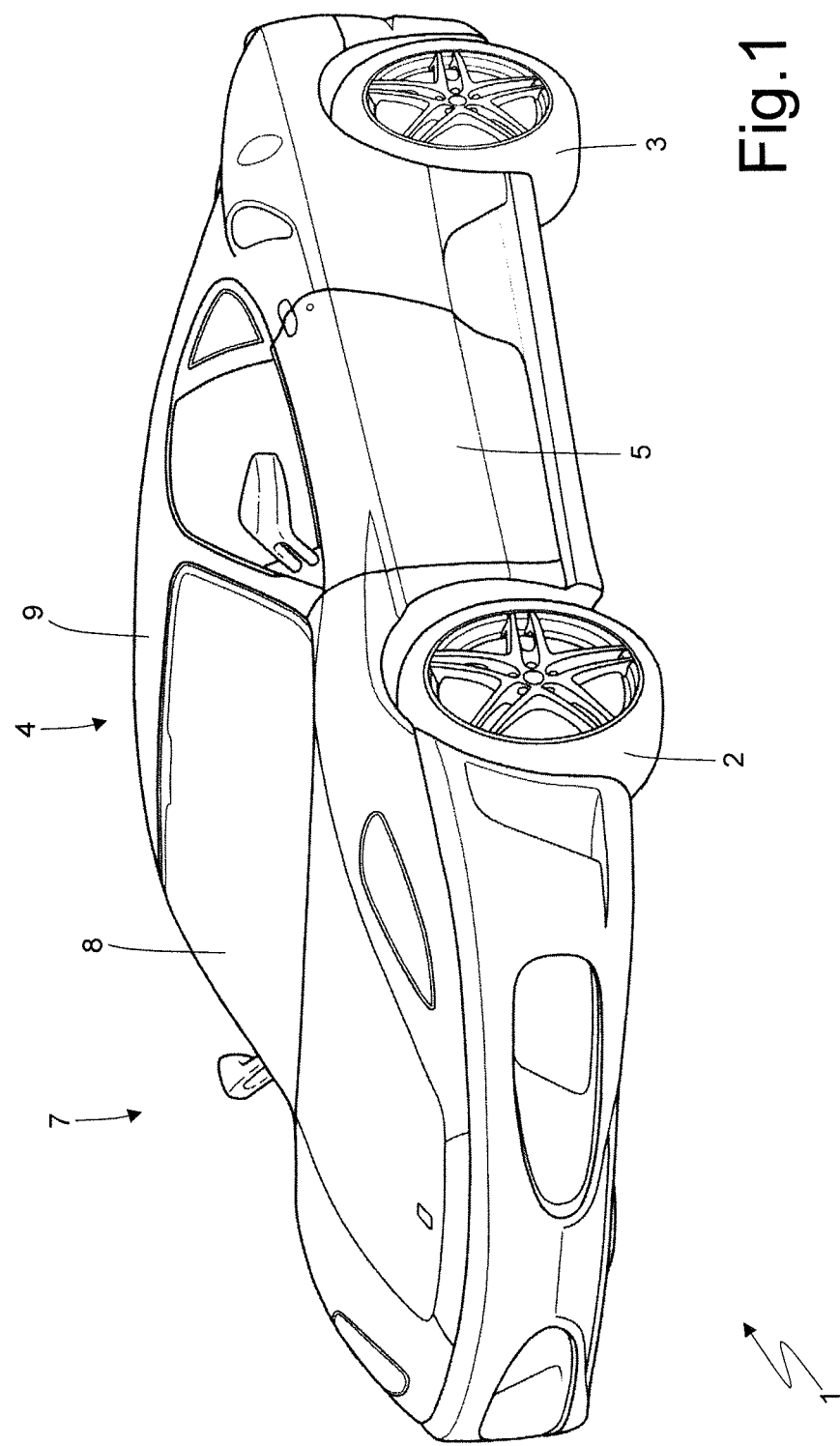
FIG. 1 is a front perspective view of a car produced according to the present invention.

In FIG. 1, reference numeral 1 globally denotes a car powered by means of an internal combustion engine arranged in a central position. The car 1 comprises a chassis, which supports the internal combustion engine, a pair of front wheels 2, and a pair of rear wheels 3.

Between the front wheels 2 and the rear wheels 3 there is a passenger compartment 4 which is accessed through a pair of doors 5. Behind the passenger compartment 4 and in a central position there is an engine compartment 6 (partially illustrated in FIGS. 2, 3 and 4) which houses the internal combustion engine.

The chassis is covered by a car body 7 which comprises, among other things, the doors 5, a transparent windscreen 8 which delimits the passenger compartment 4 at the front and a roof 9 that delimits the passenger compartment 4 on the upper side. Connected to the car body 7 is a rear spoiler 10 (illustrated in FIGS. 2, 3 and 4) which is a continuation of the car body 7 and comes into contact with said car body 7 along the entire transverse length thereof. Furthermore, the car body 7 comprises a rear panel system 11 (illustrated in FIGS. 2, 3 and 4), which joins the roof 9 to the rear area, closes the engine compartment 6 at the top and ends in correspondence with the rear spoiler 10.

As illustrated in FIGS. 2 to 5, the rear spoiler 10 is integral with the car body 7, constitutes a seamless continuation of the car body 7, is arranged in a rear position and projects from the outline of the car body 7 to deflect the air flow upwards so that the air flow skims over an upper surface 12 of said rear spoiler 10. The rear spoiler 10 comprises a through aerodynamic duct 13 which starts in an inlet opening 14 arranged in correspondence with an initial (front) end of the rear spoiler 10 and ends in an outlet opening 15 arranged in correspondence with a final (rear) end of the rear spoiler 10 so that (as is clearly illustrated in FIG. 5) a part of the air flow hitting the rear spoiler 10 flows above the rear spoiler 10 skimming over the upper surface 12 of said rear spoiler 10 and the remaining part of the air flow hitting the rear spoiler 10 flows through the rear spoiler 10 crossing the aerodynamic duct 13.

In the embodiment illustrated in the accompanying figures, the rear spoiler 10 comprises a single aerodynamic duct 13; according to a different and perfectly equivalent embodiment, the rear spoiler 10 comprises two or three aerodynamic ducts 13 arranged side by side and separated from one another by a corresponding dividing wall.

According to that illustrated in FIG. 5, the aerodynamic duct 13 has, on the inside, a narrowing 16, which locally reduces the area of the cross section (i.e., only along a short section of the length when compared to the entire length of the aerodynamic duct 13). According to a preferred embodiment illustrated in FIG. 5, the area of the cross section of the aerodynamic duct 13 is substantially constant along the entire length of the aerodynamic duct 13 with the sole exception of the narrowing 16; as a consequence, the area of the cross section of the aerodynamic duct 13 upstream of the narrowing 16 is substantially equal to the area of the cross section of the aerodynamic duct 13 downstream of the narrowing 16.

In the embodiment illustrated in the accompanying figures, the narrowing 16 of the aerodynamic duct 13 consists of a deflector profile 17 that projects towards the inside of the aerodynamic duct 13. According to a possible embodiment, the deflector profile 17 is movable so as to change its position on the inside of the aerodynamic duct 13; in particular, it is provided with an actuator 18 (for example an electric motor) that is mechanically connected to the deflector profile 17 so as to move the position of the deflector profile 17 on the inside of the aerodynamic duct 13 between a position of maximum incidence (and thus maximum narrowing) and a position of minimum incidence (thus of minimum narrowing). Changing the position of the deflector profile 17 changes the impact of the narrowing 16 in the aerodynamic duct 13 and thus changes the air flow rate through the aerodynamic duct 13 (the greater the narrowing, the lower the air flow rate through the aerodynamic duct 13) in relation to the air flow rate over the rear spoiler 10; as a consequence, by changing the position of the deflector profile 17 it is possible to increase/decrease the negative lift (i.e., the downforce) generated by the rear spoiler 10 and at the same time decrease/increase the drag generated by the rear spoiler 10. Thus, by changing the position of the deflector profile 17 it is possible to adjust (optimise) the aerodynamic action of the rear spoiler 10 in relation to the state of motion of the car 1.

According to that illustrated in FIG. 5, the rear spoiler 10 has a cross section of a triangular shape and has the upper surface 12 over which the air flow flowing above the rear spoiler 10 skims, a lower surface 19 which delimits the aerodynamic duct 13 on the upper side, and a rear surface 20.

According to that illustrated in FIG. 5, the rear panel system 11 ends in correspondence with the rear spoiler 10 and is joined without discontinuity (i.e., without any gaps and with no abrupt slope gradient variations) to a lower surface 21 of the aerodynamic duct 13. Preferably, the rear panel system 11 has the same inclination as the lower surface 21 of the aerodynamic duct 13 at least close to the rear spoiler 10.

Figure 2:
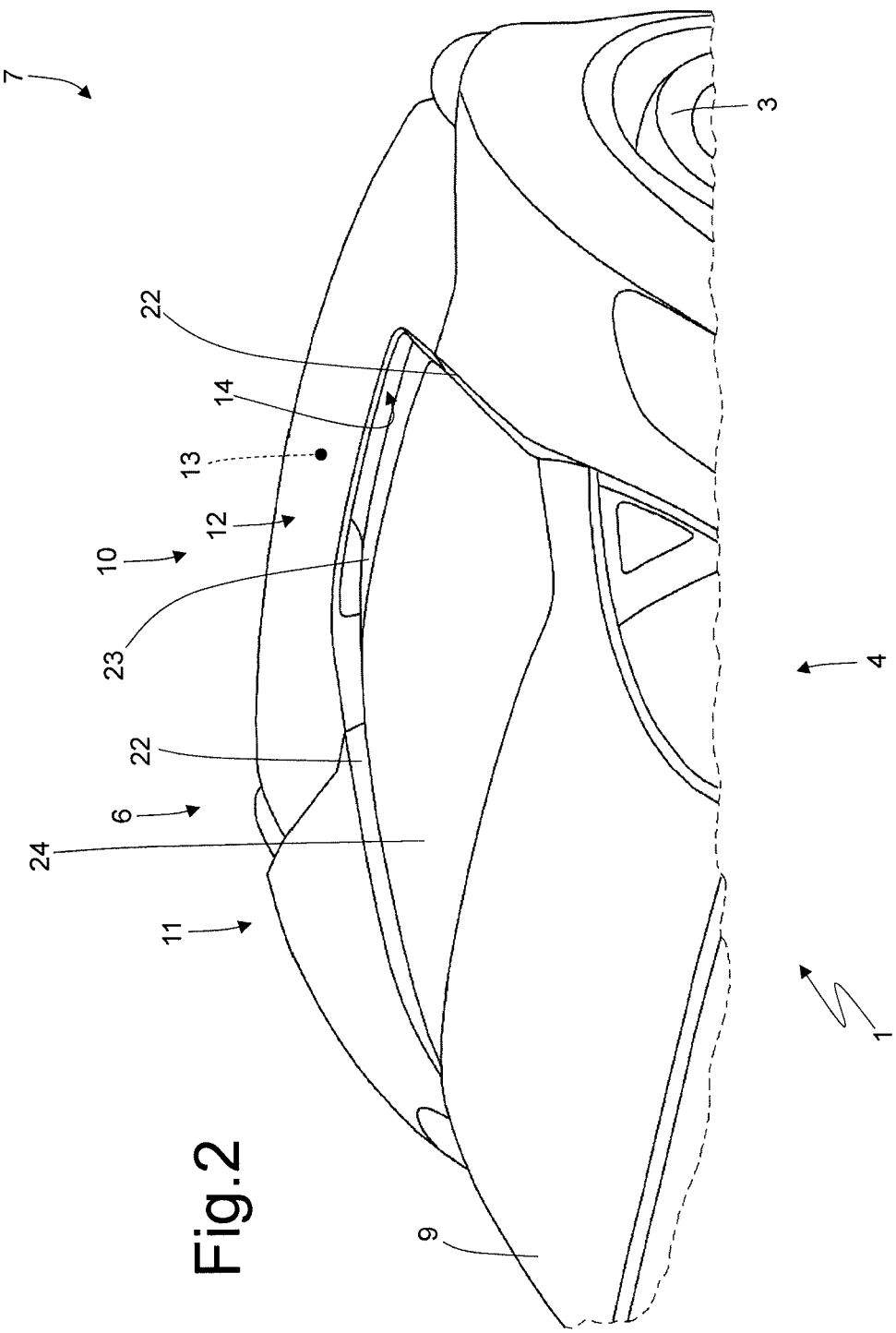
FIG. 2 is a perspective view of a rear part of the car of FIG. 1.
Figure 3:
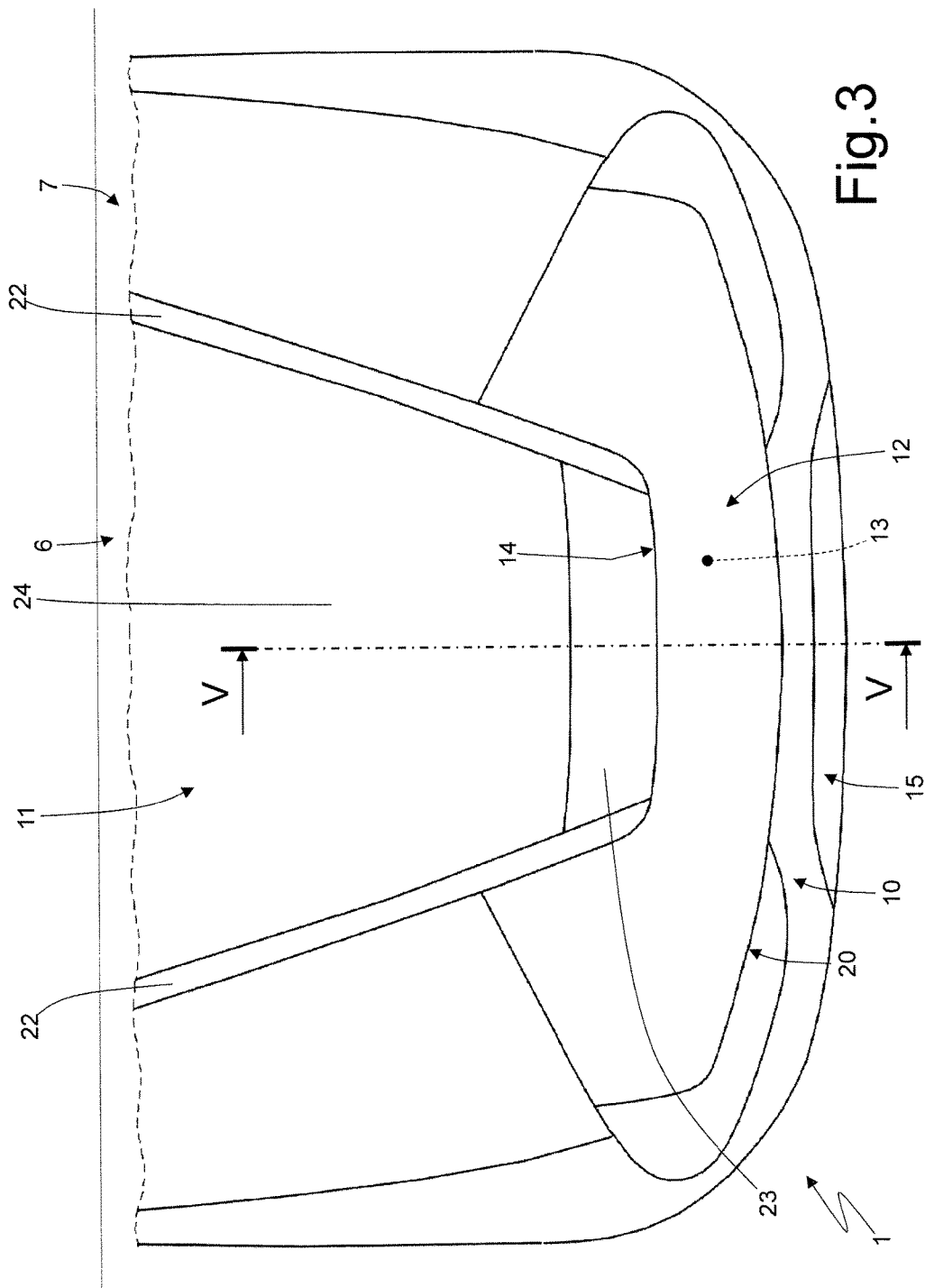
FIG. 3 is a plan view of a rear part of the car of FIG. 1.
Figure 4:
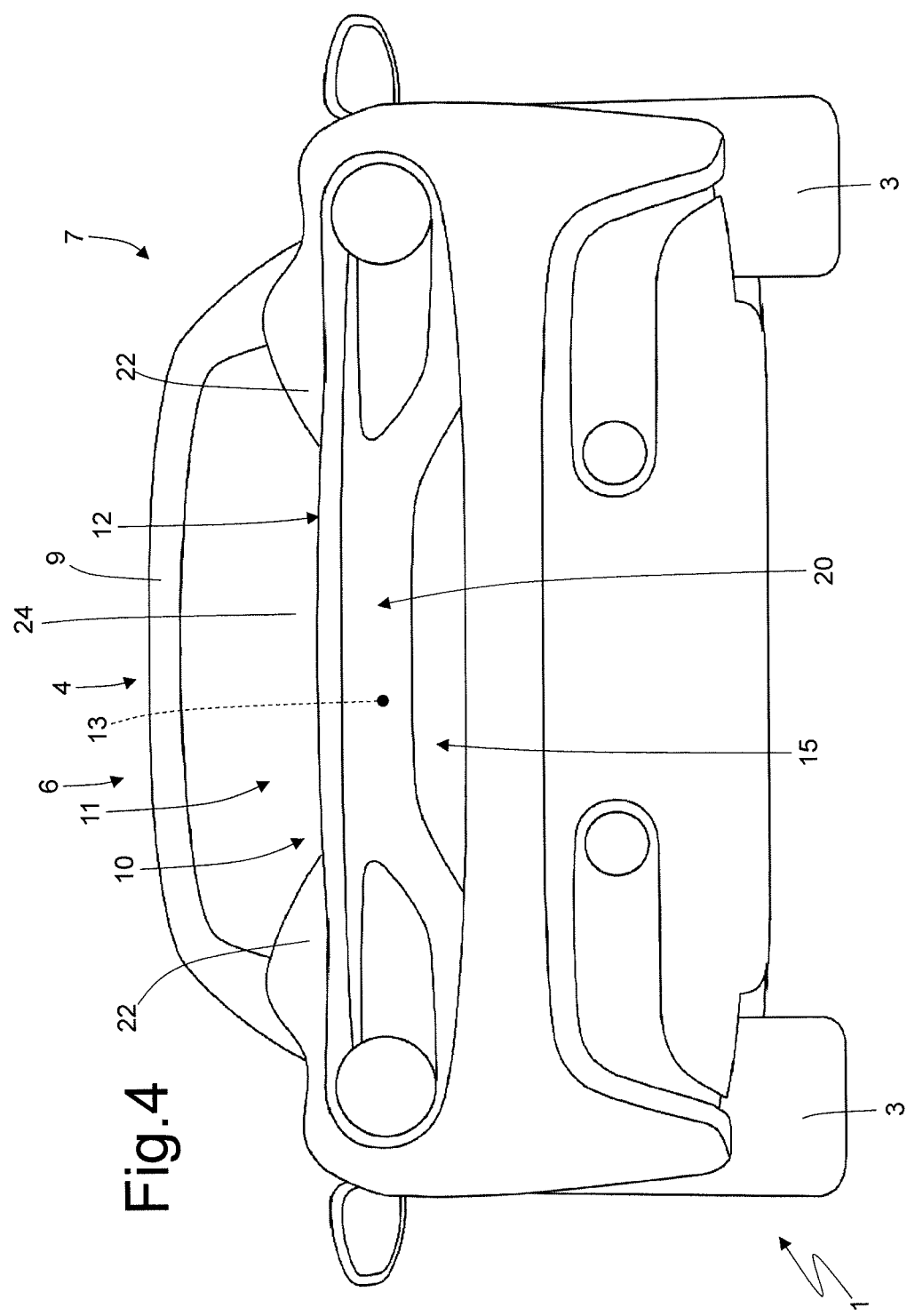
FIG. 4 is a rear view of the car of FIG. 1.

According to a preferred (but not binding) embodiment illustrated in FIGS. 2 and 3, the car body 7 comprises two side boards 22, which are arranged on opposite sides of the rear panel system 11 and are arranged so as to converge in order to progressively reduce the distance between them as they get closer to the rear spoiler 10. In particular, the two side boards 22 end in correspondence with lateral edges of the inlet opening 14 of the aerodynamic duct 13.

According to a preferred (but not binding) embodiment illustrated in FIGS. 2, 3 and 5, the rear panel system 11 comprises a fixed panel 23 arranged in correspondence with the rear spoiler 10 and a movable panel 24 which is arranged between the roof 9 and the panel 23 and constitutes a hood of the engine compartment 6.

Numerous advantages are achieved with the car 1 described above.

First, the rear spoiler 10 described above achieves good aerodynamic efficiency, i.e., it has a very favourable ratio between the negative lift and the corresponding drag. This result is achieved owing to the presence of the aerodynamic duct 13 thanks to which it is possible to increase the aerodynamic recompression in correspondence with the rear panel system 11 increasing the negative lift (i.e. downforce) without any significant increase in drag.

Moreover, notwithstanding the relatively small size of the rear spoiler 10 described above, it is capable of generating a very high negative lift force. This result is also achieved owing to the presence of the aerodynamic duct thanks to which it is possible to increase the aerodynamic recompression in correspondence with the rear panel system 11 increasing the negative lift (i.e. downforce) without having to increase the size of the rear spoiler 10.

The aerodynamic action of the rear spoiler 10 described above can be adjusted easily, quickly and accurately by increasing or decreasing the negative lift that is generated, in real-time.

Lastly, the rear spoiler 10 described above is easy and economical to produce, in that it may be entirely made by appropriately shaping existing components of the car body 7 (i.e. without the need for any additional components other than the deflector profile 17 and the respective actuator 18 of the deflector profile 17).

What is claimed is:

1. A car comprising:
    a car body; and
    a rear spoiler, which is integral with the car body, is arranged in a rear position and projects from an outline of the car body to deflect the air flow upwards so that the air flow skims over an upper surface of said rear spoiler;
    wherein the rear spoiler comprises at least one through aerodynamic duct, which starts in an inlet opening arranged in correspondence with an initial end of the rear spoiler and ends in an outlet opening arranged in correspondence with a final end of the rear spoiler, so that a part of the air flow hitting the rear spoiler flows above the rear spoiler skimming over the upper surface of said rear spoiler and the remaining part of the air flow hitting the rear spoiler flows through the rear spoiler crossing the aerodynamic duct;
    wherein:
    the aerodynamic duct has, on the inside, a narrowing, which consists of a deflector profile that projects towards an inside of the aerodynamic duct, is arranged in a central position along the aerodynamic duct and locally reduces an area of a cross section; and
    wherein the area of the cross section of the aerodynamic duct upstream of the narrowing is equal to the area of the cross section of the aerodynamic duct downstream of the narrowing;
    wherein the deflector profile is movable so as to change its position on the inside of the aerodynamic duct between a position of maximum incidence and thus maximum narrowing and a position of minimum incidence and thus of minimum narrowing to increase/decrease the negative lift, i.e., the downforce, generated by the rear spoiler and at the same time decrease/increase the drag generated by the rear spoiler; and
    wherein an electric motor is provided, which is mechanically connected to the deflector profile so as to move the position of the deflector profile on the inside of the aerodynamic duct between the position of maximum incidence and the position of minimum incidence.

2. A car according to claim 1, wherein the area of the cross section of the aerodynamic duct is substantially constant along an entire extension of the aerodynamic duct, with the sole exception of the narrowing.

3. A car according to claim 1, wherein the rear spoiler has a cross section with a triangular shape and has the upper surface, over which the air flow flowing above the rear spoiler skims, a lower surface, which delimits the aerodynamic duct on the upper side, and a rear surface.

4. A car according to claim 1, wherein the car body comprises:
- a roof, which delimits a passenger compartment on the upper side; and
- a rear panel system, which joins the roof to a rear area, ends in correspondence with the rear spoiler, and is joined, without discontinuity, to a lower surface of the aerodynamic duct.

5. A car according to claim 4, wherein the rear panel system has the same inclination as the lower surface of the aerodynamic duct at least close to the rear spoiler.

6. A car according to claim 4, wherein the car body comprises two side boards, which are arranged on opposite sides of the rear panel system and are arranged so as to converge in order to progressively reduce the distance between them as they get closer to the rear spoiler.

7. A car according to claim 6, wherein the two side boards end in correspondence with lateral edges of the inlet opening of the aerodynamic duct.

8. A car according to claim 4, wherein the rear panel system comprises a first fixed panel, which is arranged in correspondence with the rear spoiler, and a second movable panel, which is arranged between the roof and the first panel.

9. A car according to claim 8, wherein:
- at least one engine compartment is provided, which houses an engine and is arranged behind the passenger compartment; and
- the second panel makes up a hood of the engine compartment.

* * * * *